(12) United States Patent
Izumikawa et al.

(10) Patent No.: US 11,260,793 B2
(45) Date of Patent: Mar. 1, 2022

(54) CONSTRUCTION MACHINE AND METHOD OF CONTROLLING CONSTRUCTION MACHINE

(71) Applicant: SUMITOMO(S.H.I.) CONSTRUCTION MACHINERY CO., LTD., Tokyo (JP)

(72) Inventors: Takeya Izumikawa, Chiba (JP); Takashi Nishi, Chiba (JP)

(73) Assignee: SUMITOMO (S.H.I.) CONSTRUCTION MACHINERY CO., LTD., Tokyo (JP)

( * ) Notice: Subject to any disclaimer, the term of this patent is extended or adjusted under 35 U.S.C. 154(b) by 90 days.

(21) Appl. No.: 15/284,603

(22) Filed: Oct. 4, 2016

(65) Prior Publication Data

US 2017/0021769 A1    Jan. 26, 2017

Related U.S. Application Data

(63) Continuation of application No. PCT/JP2015/062299, filed on Apr. 22, 2015.

(30) Foreign Application Priority Data

Apr. 25, 2014    (JP) .............................. JP2014-091888

(51) Int. Cl.
  *B60R 1/00*    (2006.01)
  *B60K 37/06*    (2006.01)
  (Continued)

(52) U.S. Cl.
  CPC ................ *B60R 1/00* (2013.01); *B60K 35/00* (2013.01); *B60K 37/02* (2013.01); *B60K 37/06* (2013.01);
  (Continued)

(58) Field of Classification Search
  CPC ..... B60R 1/00; B60R 2300/207; B60K 35/00; B60K 37/02; B60K 37/06; B60K 2370/61;
  (Continued)

(56) References Cited

U.S. PATENT DOCUMENTS 5,539,499 A    7/1996 Fujisawa
6,178,393 B1 *  1/2001 Irvin ................... F04D 15/0066
                                              700/282
(Continued)

FOREIGN PATENT DOCUMENTS

DE    10-2013-203653 A1 *  3/2013    ............... B60R 1/00
EP    1752588    2/2007
(Continued)

OTHER PUBLICATIONS

International Search Report dated Jul. 28, 2015.

*Primary Examiner* — Rocio Del Mar Perez-Velez
*Assistant Examiner* — Alicia M. Choi
(74) *Attorney, Agent, or Firm* — IPUSA, PLLC

(57) ABSTRACT

A construction machine includes an image capturing device configured to capture an image of the surroundings, an image display part mounted in an operator's cab and configured to display a menu screen showing an operating condition and various settings, or the captured image captured with the image capturing device, an operation part including a menu switch to cause the menu screen to be displayed on the image display part, and a detector configured to detect whether a work element is enabled or disabled. The image display part is configured to display a warning in response to the menu switch being operated while the work element is enabled.

18 Claims, 12 Drawing Sheets

(51) Int. Cl.
*B60K 37/02* (2006.01)
*E02F 9/22* (2006.01)
*E02F 9/26* (2006.01)
*B60K 35/00* (2006.01)
*G05B 15/02* (2006.01)
*G05D 7/06* (2006.01)
*H04N 5/232* (2006.01)
*H04N 5/247* (2006.01)
*H04N 7/18* (2006.01)
*G06F 3/0482* (2013.01)

(52) U.S. Cl.
CPC .............. *E02F 9/226* (2013.01); *E02F 9/261* (2013.01); *E02F 9/267* (2013.01); *G05B 15/02* (2013.01); *G05D 7/0635* (2013.01); *H04N 5/23238* (2013.01); *H04N 5/247* (2013.01); *H04N 7/181* (2013.01); *B60K 2370/135* (2019.05); *B60K 2370/152* (2019.05); *B60K 2370/155* (2019.05); *B60K 2370/178* (2019.05); *B60K 2370/61* (2019.05); *B60R 2300/207* (2013.01); *B60Y 2200/41* (2013.01); *G06F 3/0482* (2013.01)

(58) Field of Classification Search
CPC ........ B60K 2370/155; B60K 2370/178; B60K 2370/135; B60K 2370/152; E02F 9/26; E02F 9/226; E02F 9/267; E02F 9/261; G05B 15/02; G05D 7/0635; H04N 5/23238; H04N 5/247; H04N 7/181; H04N 7/18; B60Y 2200/41; G06F 3/0482
See application file for complete search history.

(56) References Cited

U.S. PATENT DOCUMENTS

| | | | |
|---|---|---|---|
| 7,657,841 B2 | 2/2010 | Shibamori et al. | |
| 8,726,648 B2 * | 5/2014 | Sato | E02F 9/2246 60/431 |
| 2002/0078393 A1 * | 6/2002 | Parker | G06F 1/1626 713/324 |
| 2003/0001750 A1 * | 1/2003 | Ishimoto | E02F 9/26 340/691.6 |
| 2005/0151845 A1 * | 7/2005 | Tsukada | E02F 9/26 348/148 |
| 2007/0046804 A1 * | 3/2007 | Hirano | H04N 5/3572 348/333.01 |
| 2007/0168101 A1 | 7/2007 | Shibamori et al. | |
| 2008/0231744 A1 * | 9/2008 | Khanna | H04N 5/2251 348/373 |
| 2009/0009308 A1 | 1/2009 | Date et al. | |
| 2009/0096937 A1 * | 4/2009 | Bauer | B60R 1/12 348/739 |
| 2010/0091103 A1 | 4/2010 | Peltonen et al. | |
| 2013/0176120 A1 * | 7/2013 | Shibamori | E02F 9/267 340/438 |
| 2016/0258134 A1 * | 9/2016 | Matsumoto | E02F 9/26 |
| 2017/0107693 A1 * | 4/2017 | Yamada | E02F 9/16 |

FOREIGN PATENT DOCUMENTS

| | | | | |
|---|---|---|---|---|
| JP | H06-059840 | | 3/1994 | |
| JP | 2002-275949 | | 9/2002 | |
| JP | 2004076351 A | * | 3/2004 | |
| JP | 2005-138751 | | 6/2005 | |
| JP | 2005-155274 | | 6/2005 | |
| JP | 2005-307483 | | 11/2005 | |
| JP | 4079113 | | 4/2008 | |
| JP | 2009-127297 | | 6/2009 | |
| JP | 2010-043419 | | 2/2010 | |
| JP | 2012-025346 | | 2/2012 | |
| JP | 2012-025346 A | * | 2/2012 | ............. B60R 16/02 |
| JP | 2012025346 A | * | 2/2012 | |
| KR | 20020012490 A | * | 2/2002 | ............. B60K 37/02 |
| KR | 101856783 B1 | * | 12/2011 | ............. B60K 35/00 |
| WO | 2007/018021 | | 2/2007 | |

* cited by examiner

CONSTRUCTION MACHINE AND METHOD OF CONTROLLING CONSTRUCTION MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2015/062299, filed on Apr. 22, 2015 and designated the U.S., which claims priority to Japanese Patent Application No. 2014-091888, filed on Apr. 25, 2014. The entire contents of the foregoing applications are incorporated herein by reference.

BACKGROUND

Technical Field

The present invention relates to construction machines and methods of controlling a construction machine.

Description of Related Art

Construction machines with a display unit installed in an operator's cab have been put to practical use. The display unit displays vehicle information such as the remaining amount of fuel, water temperature, oil temperature, and a cumulative operating time and images of the surroundings captured with a camera mounted on a vehicle body. According to such construction machines, for example, an operator operates a display change switch to switch an image displayed on the display unit between vehicle information and an image of the surroundings.

SUMMARY

According to an aspect of the present invention, a construction machine includes an image capturing device configured to capture an image of the surroundings, an image display part mounted in an operator's cab and configured to display a menu screen showing an operating condition and various settings, or the captured image captured with the image capturing device, an operation part including a menu switch to cause the menu screen to be displayed on the image display part, and a detector configured to detect whether a work element is enabled or disabled. The image display part is configured to display a warning in response to the menu switch being operated while the work element is enabled.

DETAILED DESCRIPTION

Figure 1:
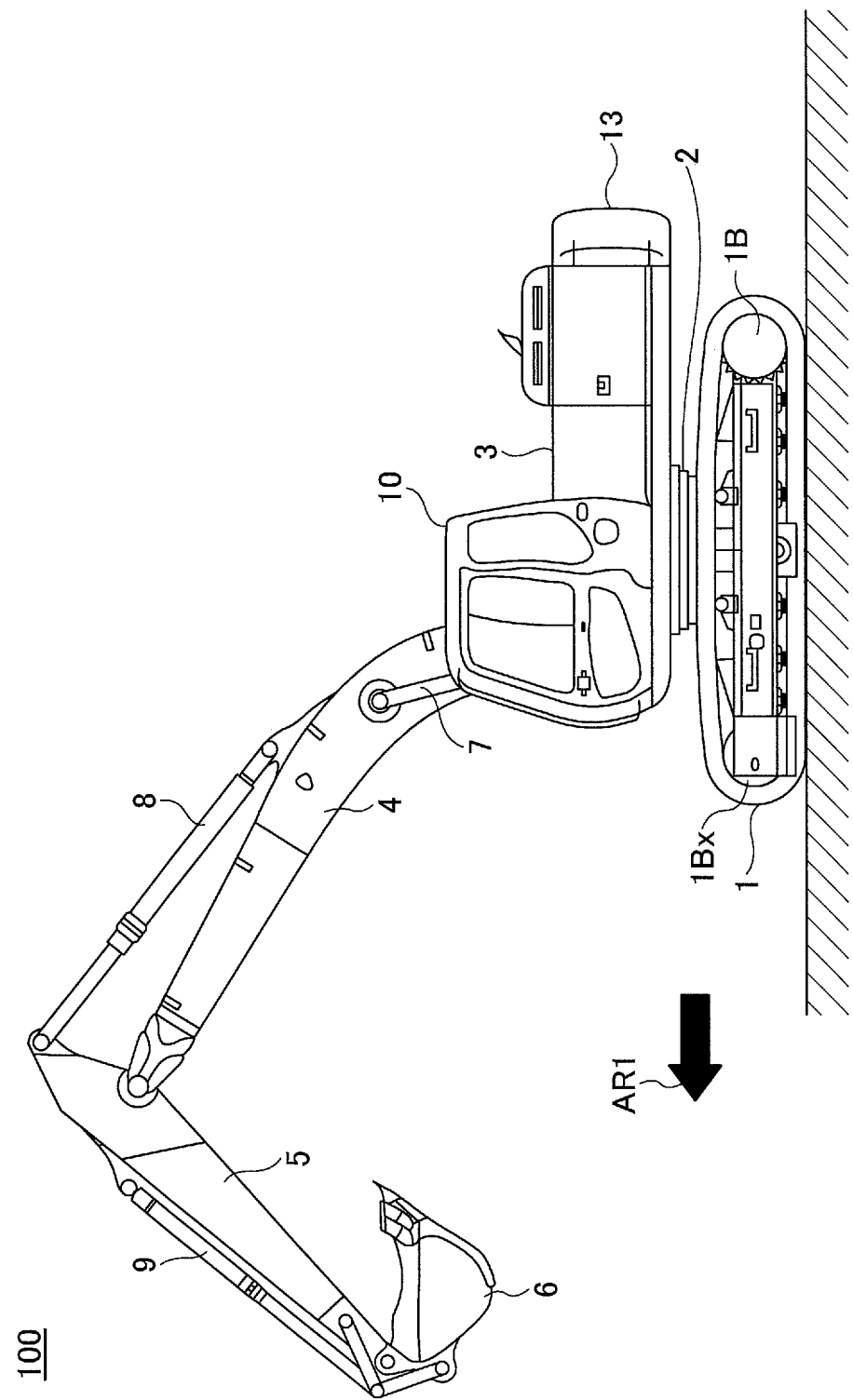
FIG. 1 is a side view of a shovel according to an embodiment.

When the image displayed on the display unit is switched from an image captured with a camera to vehicle information during work, the operator may be prevented from checking the surroundings to reduce the safety of work.

According to an embodiment of the present invention, a construction machine configured to urge display of an image of the surroundings captured with an image capturing device on a display unit to secure work safety is provided.

An embodiment of the invention is described below with reference to the accompanying drawings. In the drawings, the same configuration is given the same character, and a repetitive description thereof may be omitted.

FIG. 1 is a side view of a shovel 100 according to the embodiment. An upper-part turning body 3 is turnably mounted on a lower-part traveling body 1 through a turning mechanism 2. The lower-part traveling body 1 performs a traveling operation of the shovel 100. A boom 4 is attached to the upper-part turning body 3. An arm 5 is attached to an end of the boom 4, and a bucket 6 is attached to an end of the arm 5. The boom 4, the arm 5, and the bucket 6, serving as work elements, form an attachment, and are hydraulically driven by a boom cylinder. 7, an arm cylinder 8, and a bucket cylinder 9, respectively. A cabin (an operator's cab) 10 is provided on the upper-part turning body 3. Furthermore, a power source such as an engine, which is an internal combustion engine, is mounted on the upper-part turning body 3. An operator's seat is provided in the cabin 10. An operator operates the shovel 100 while being seated on the operator's seat. A counterweight 13 is provided on the side opposite from the cabin 10 on the upper-part turning body 3.

With respect to the orientation of the lower-part traveling body 1, the side on which idlers are disposed is the front side, and the side on which traveling hydraulic motors are disposed is the rear side, irrespective of the orientation of the upper-part turning body 3. Accordingly, when the operator tilts a traveling lever toward the front side of the cabin 10, the lower-part traveling body 1 travels in the direction of arrow AR1 whichever direction the attachment is oriented. In FIG. 1, an idler 1Bx (for the left) and a traveling hydraulic motor 1B (for the left) are visible, while an idler (for the right) and a traveling hydraulic motor 1A (for the right) are not visible.

Figure 2:
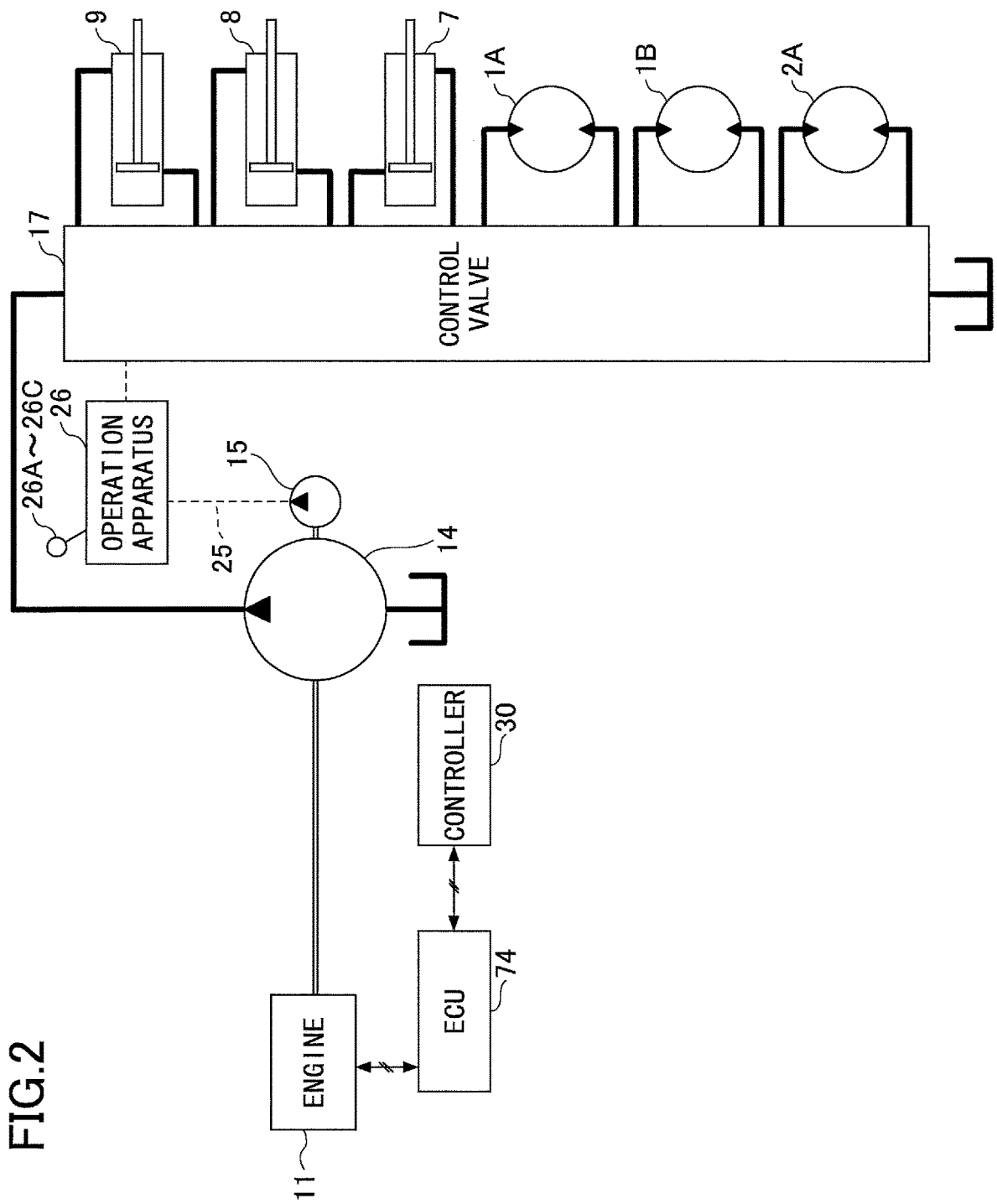
FIG. 2 is a block diagram of a configuration of a drive system of the shovel depicted in FIG. 1.

FIG. 2 is a block diagram depicting a configuration of a drive system of the shovel 100 depicted in FIG. 1. In FIG. 2, a mechanical power system, a high-pressure hydraulic line, a pilot line, and an electrical control system are indicated by a double line, a thick solid line, a dashed line, and a thin solid line, respectively.

The drive system of the shovel 100 is mounted on the upper-part turning body 3, and includes an engine 11, a main pump 14, a pilot pump 15, a control valve 17, an operation apparatus 26, a controller 30, and an engine control unit (ECU) 74.

The engine 11, which is a drive source of the shovel 100, is, for example, a diesel engine that operates to maintain a predetermined rotational speed. The output shaft of the engine 11 is connected to the input shafts of the main pump 14 and the pilot pump 15.

The main pump 14, which is a hydraulic pump that supplies hydraulic oil to the control valve 17 through a high-pressure hydraulic line, is, for example, a swash-plate variable displacement hydraulic pump. The pilot pump 15, which is a hydraulic pump for supplying hydraulic oil to various hydraulic control apparatuses via a pilot line 25, is, for example, a fixed displacement hydraulic pump.

The control valve 17 is a hydraulic control valve that controls the hydraulic system of the shovel 100. The control valve 17 selectively supplies hydraulic oil supplied from the main pump 14 to one or more of work elements such as the boom cylinder 7, the arm cylinder 8, the bucket cylinder 9, a traveling hydraulic motor 1A (for the right), the traveling hydraulic motor 1B (for the left), and a turning hydraulic motor 2A. In the following description, the boom cylinder 7, the arm cylinder 8, the bucket cylinder 9, the traveling hydraulic motor 1A (for the right), the traveling hydraulic motor 1B (for the left), and the turning hydraulic motor 2A are collectively referred to as "hydraulic actuators".

The operation apparatus 26, which is an apparatus that the operator uses to operate the hydraulic actuators, is disposed in the cabin 10. Furthermore, the operation apparatus 26 supplies hydraulic oil supplied from the pilot pump 15 to the pilot ports of flow control valves corresponding to the individual hydraulic actuators via the pilot line 25. The pressure of hydraulic oil supplied to each pilot port is a pressure commensurate with the direction of operation and the amount of operation of one of operation levers 26A, 26B and 26C corresponding to the hydraulic actuators. The operation lever 26C is a traveling lever.

The controller 30, which is a control unit for controlling the shovel 100, is composed of, for example, a computer including a CPU, a RAM, and a ROM. The CPU of the controller 30 executes processes corresponding to each program by reading a program corresponding to operations and functions of the shovel 100 and executing the program while loading the program into the RAM.

The ECU 74 is a device that controls the engine 11. The ECU 74 collects various kinds of data indicating the condition of the engine 11, and transmits the collected data to the controller 30. Referring to FIG. 2, the ECU 74 and the controller 30 are separate configurations, but the ECU 74 and the controller 30 may also be configured as a single unit. For example, the ECU 74 may be integrated into the controller 30.

According to the shovel 100 having the above-described configuration, an image display unit that displays various kinds of information is disposed near the operator's seat to assist the operator in operating the shovel 100. The operating conditions, the control information, etc., of the shovel 100 are displayed on an image display part of the image display unit to enable the operator to obtain such information. Furthermore, the operator may operate an operation part provided on the image display unit to input information and instructions to the controller 30 of the shovel 100.

Figure 3:
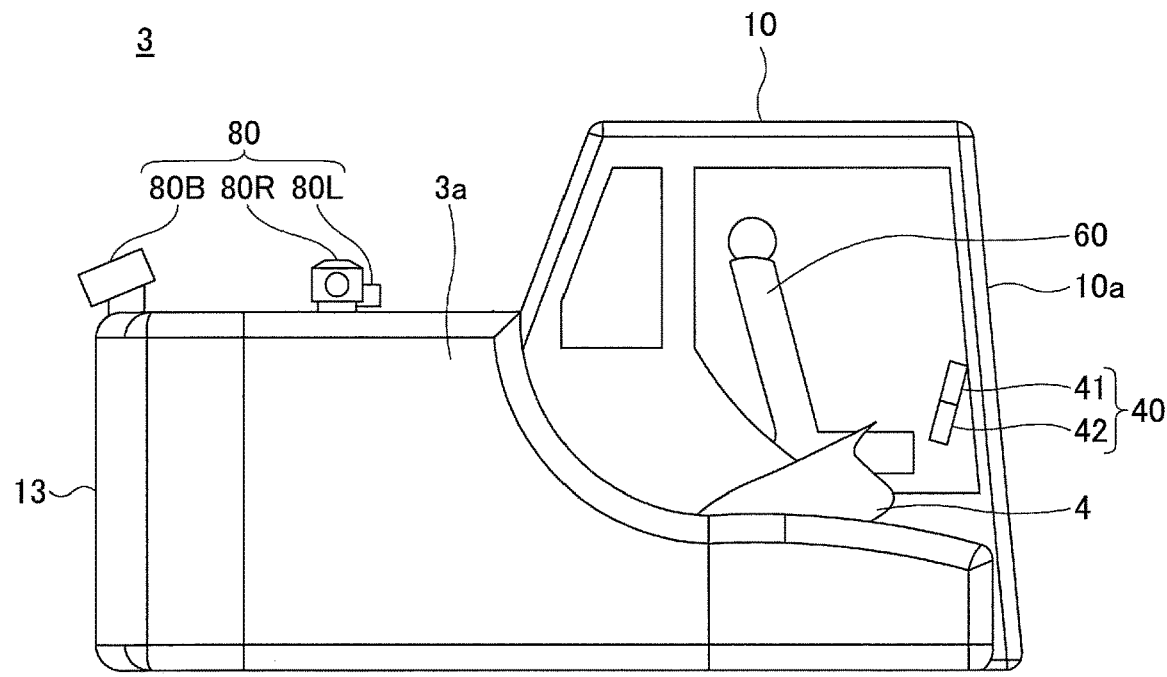
FIG. 3 is a side view of an upper-part turning body according to the embodiment.
Figure 4:
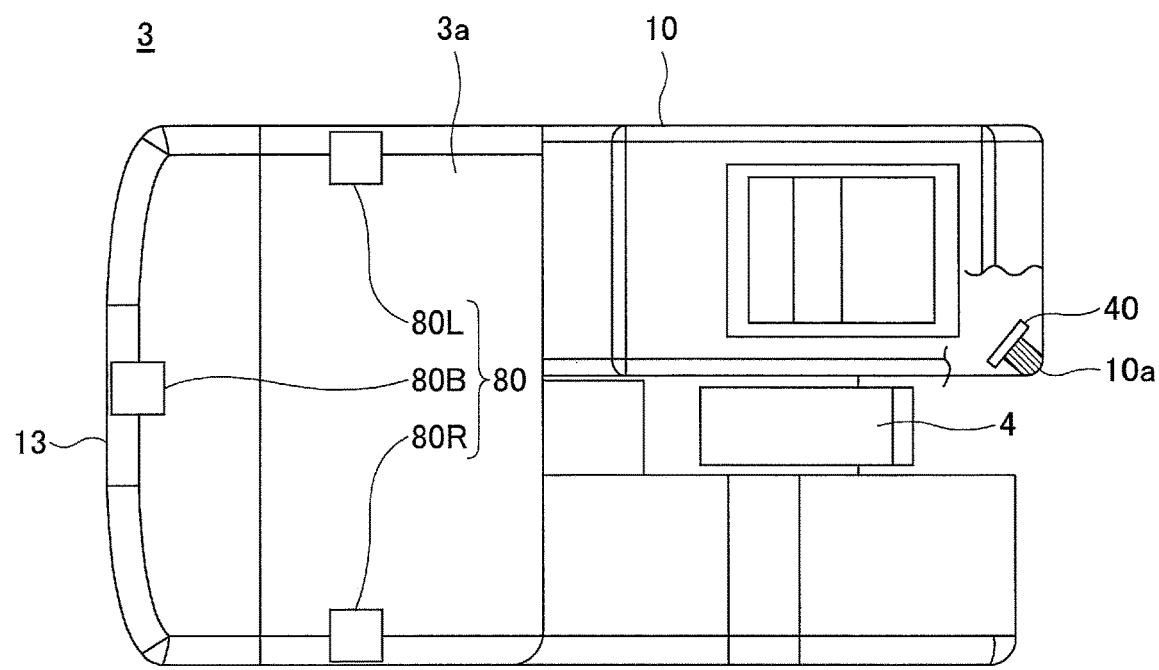
FIG. 4 is a plan view of the upper-part turning body according to the embodiment.

FIG. 3 is a side view of the upper-part turning body 3 according to the embodiment. FIG. 4 is a plan view of the upper-part turning body 3 according to the embodiment.

An image display unit 40 includes an image display part 41 and an operation part 42, and is fixed to a frame (pillar) 10a of the cabin 10 including an operator's seat 60. According to this embodiment, the image display part 41 and the operation part 42 are formed as a single body. Alternatively, the image display part 41 and the operation part 42 may be formed as separate bodies to be provided at different positions.

In general, the boom 4 is disposed on the right side of the operator seated on the operator's seat 60, and the operator often operates the shovel 100 while viewing the arm 5 and the bucket 6 attached to the end of the boom 4. Therefore, according to this embodiment, the image display unit 40 is provided on the frame 10a on the right side, on which side the boom 4 is provided, to enable the operator to check the image display unit 40 while operating the arm 5 and the bucket 6.

Thus, the image display unit 40 is preferably provided at a position that easily comes into the field of vision of the operator who performs work. The configuration illustrated by way of example in this embodiment, however, is not limiting, and the image display unit 40 may be provided anywhere near the operator's seat 60.

Furthermore, as depicted in FIGS. 3 and 4, image capturing devices 80 that capture images of the surroundings of the shovel 100 are provided on a cover 3a of the upper-part turning body 3 that covers the engine 11, etc. According to this embodiment, a left-side monitoring camera 80L, a rear monitoring camera (a counterweight 13 side camera) 80B, and a right-side monitoring camera 80R are provided as the image capturing devices 80. The number of the image capturing devices 80 installed may be at least one, and the number and the installation positions are not limited to the configuration illustrated by way of example in this embodiment.

Figure 5:
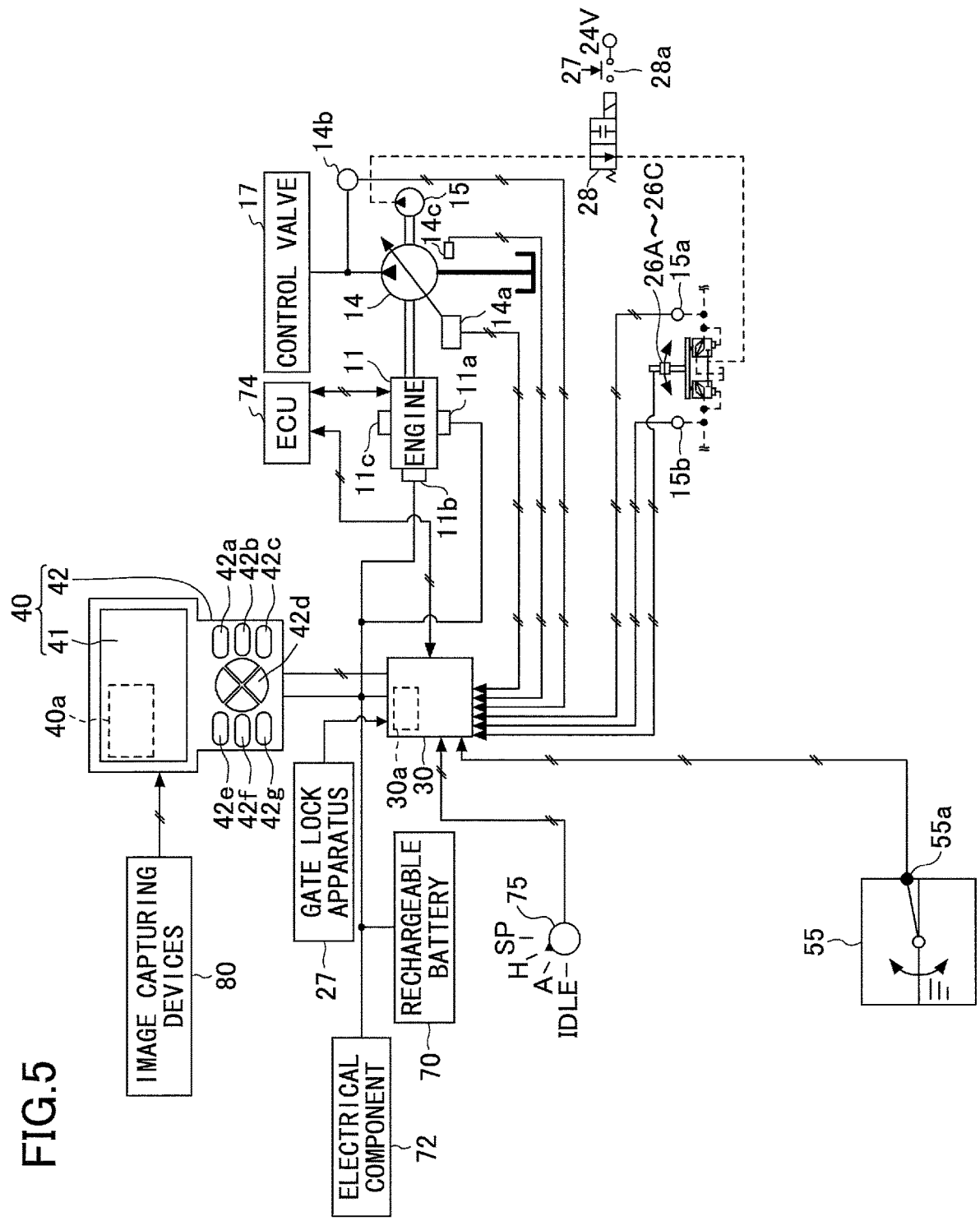
FIG. 5 is a diagram depicting a connection between a controller and an image display unit of the shovel according to the embodiment.

FIG. 5 is a block diagram depicting a connection of the controller 30 and the image display unit 40 of the shovel 100 according to the embodiment.

The image display unit 40 is connected to the controller 30 via a communication network such as a Controller Area Network (CAN) or a Local Interconnect Network (LIN). The image display unit 40 is connected to the image capturing devices 80 via, for example, dedicated lines. The image display unit 40 may alternatively be connected to the controller 30 via a dedicated line.

The image display unit 40 includes a conversion part 40a that generates an image to be displayed on the image display part 41. Captured images output from the image capturing devices 80 (the left-side monitoring camera 80L, the rear monitoring camera 80B, and the right-side monitoring camera 80R) are input to the conversion part 40a. Furthermore, for example, data indicating the temperature of engine coolant water, data indicating the temperature of hydraulic oil, data indicating the remaining amount of fuel, and fuel efficiency information are input to the conversion part 40a from the controller 30.

The conversion part 40a generates an image signal to be displayed on the image display part 41 of the image display unit 40 based on captured images from the image capturing devices 80 and various kinds of data from the controller 30. The image display part 41 displays an image based on the image signal generated by the conversion part 40a.

The conversion part 40a may be implemented not as a function of the image display unit 40 but as a function of the controller 30. In this case, the image capturing devices 80 are connected to the controller 30.

Furthermore, the image display unit 40 includes the operation part 42 that includes various hardware switches. According to this embodiment, a menu switch 42a, a camera switch 42b, an operating time display change switch 42c, an operation switch 42d, a traveling mode switch 42e, an engine aftertreatment switch 42f, and an attachment change switch 42g are provided in the operation part 42.

The menu switch 42a is a switch to cause a menu screen showing an operating condition and various settings to be displayed on the image display part 41. The menu screen is a screen to display various kinds of information on the shovel 100 and receive the operator's operations such as changing the settings of various parameters or the like. The camera switch 42b is a switch to cause captured images captured with the image capturing devices 80 to be displayed on the image display part 41, and is a switch to switch images to be displayed on the image display part 41 captured with the image capturing devices 80.

When the camera switch 42b is depressed during display of the menu screen on the image display part 41, an image displayed on the image display part 41 switches to an image captured with the image capturing devices 80. In this case, an image captured with one or more of the left-side monitoring camera 80L, the rear monitoring camera 80B, and the right-side monitoring camera 80R is displayed on the image display part 41. Furthermore, when the camera switch 42b is depressed during display of an image captured with the image capturing devices 80 on the image display part 41, an image displayed on the image display part 41 switches to an image including an image captured with a camera different from a camera of display at the point.

The operating time display change switch 42c is a switch to change operating time information displayed on the image display part 41. At least one of the lifelong operating time and the section operating time of the shovel 100 is displayed on the image display part 41. Furthermore, fuel efficiency information corresponding to the operating time information is displayed on the image display part 41. For example, when the lifelong operating time is displayed, lifelong average fuel efficiency is displayed as fuel efficiency information together with the lifelong operating time. When the section operating time is displayed, section average fuel efficiency is displayed as fuel efficiency information together with the section operating time.

When the operating time display change switch 42c is depressed, the operating time information displayed on the image display part 41 is changed together with fuel efficiency information. For example, when the operating time display change switch 42c is depressed during display of the lifelong operating time and the lifelong average fuel efficiency on the image display part 41, the displayed information switches to the section operating time and the section average fuel efficiency. For example, when the operating time display change switch 42c is depressed during display of the section operating time and the section average fuel efficiency on the image display part 41, the displayed information switches to the lifelong operating time and the lifelong average fuel efficiency.

Alternatively, for example, when the operating time display change switch 42c is depressed during display of one of the lifelong operating time and the section operating time on the image display part 41, switching may be performed to display all of the lifelong operating time, the lifelong average fuel efficiency, the section operating time, and the section average fuel efficiency on the image display part 41.

Here, the lifelong operating time is a cumulative operating time in the entire period after manufacture of the shovel 100, and the lifelong average fuel efficiency is average fuel efficiency in the entire period after the manufacture. Furthermore, the section operating time is, for example, a cumulative operating time in a period after the counting of an operating time or the like is restarted by the operator, and the section average fuel efficiency is average fuel efficiency in the period after the restart.

The operation switch 42d is composed of four switches that are vertically and laterally separated. The top switch is a wiper switch, the right switch is a light switch, the left switch is a washer switch, and the bottom switch is an engine control switch. The wiper switch is a switch to turn on and off the wipers.

The light switch is a switch to turn on and off the lights attached to the exterior of the cabin 10. The washer switch is a switch to jet out window washer fluid. The engine control switch is a switch to switch the rotational speed of the engine 11 of the shovel 100 to AUTO, IDLE, SHUTDOWN, etc.

The traveling mode switch 42e is a switch to set the traveling mode to a low-speed mode or a high-speed mode. The engine aftertreatment switch 42f is a switch to perform aftertreatment of exhaust gas, etc. The attachment change switch 42g is a switch to change the settings of the controller 30 in accordance with various attachments such as a bucket, a rock drill, and a grapple.

The image display unit 40 operates with a supply of electric power received from a rechargeable battery 70. The rechargeable battery 70 is charged with electric power generated by an alternator 11a (electric generator) of the engine 11. The electric power of the rechargeable battery 70 is also supplied to an electrical component 72 of the shovel 100 other than the controller 30 and the image display unit 40. Furthermore, a starter 11b of the engine 11 is driven with electric power from the rechargeable battery 70 to start the engine 11.

Furthermore, according to the shovel 100 of this embodiment, an engine rotational speed adjustment dial 75 is provided in the cabin 10. The engine rotational speed adjustment dial 75 is a dial for adjusting the rotational speed of the engine 11, and according to this embodiment, is capable of switching the engine rotational speed among the four levels of SP mode, H mode, A mode, and idling mode. FIG. 5 depicts a state where the H mode is selected by the engine rotational speed adjustment dial 75.

The SP mode is a rotational speed mode selected when it is desired to give priority to workload, and uses the highest engine rotational speed. The H mode is a rotational speed mode selected when it is desired to satisfy both workload and fuel efficiency, and uses the second highest engine rotational speed. The A mode is a rotational speed mode selected when it is desired to operate the shovel 100 with low noise while giving priority to fuel efficiency, and uses the third highest engine rotational speed. The idling mode is a rotational speed mode selected when it is desired to idle the engine 11, and uses the lowest engine rotational speed. The engine 11 is controlled to a constant rotational speed at the engine rotational speed of the rotational speed mode set by the engine rotational speed adjustment dial 75.

The controller 30 receives various kinds of data transmitted from various parts. The controller 30 stores various kinds of data in a temporary storage part 30a, and transmits the stored various kinds of data and the results of operations based on the various kinds of data to the image display unit 40 as desired.

For example, the following various kinds of data are transmitted from various parts to the controller 30 to be stored in the temporary storage part 30a.

For example, data indicating a swash plate angle are transmitted from a regulator 14a of the main pump 14, which is a variable displacement hydraulic pump, to the controller 30. Furthermore, data indicating the discharge pressure of the main pump 14 are transmitted from a discharge pressure sensor 14b to the controller 30. Furthermore, an oil temperature sensor 14c is provided in a conduit between a tank in which hydraulic fluid that the main pump 14 takes in is stored and the main pump 14. Data indicating the temperature of hydraulic fluid flowing through the conduit are fed from the oil temperature sensor 14c to the controller 30.

The pilot pressures transmitted to the control valve 17 when the operation levers 26A through 26C, etc., are operated are detected with hydraulic sensors 15a and 15b, and data indicating the detected pilot pressures are fed to the controller 30. The relationship between the tilt direction of the operation lever 26C and the rotation direction of the traveling hydraulic motors 1A and 1B is determined separately from the orientation of the upper-part turning body 3 relative to the lower-part traveling body 1.

Furthermore, data indicating the setting of the engine rotational speed are constantly transmitted from the engine rotational speed adjustment dial 75 to the controller 30.

The controller 30 is further fed with data indicating the state of the remaining amount of fuel from a remaining fuel amount sensor 55a in a fuel tank 55. Specifically, the remaining fuel amount sensor 55a is composed of a float that follows a fluid level and a variable resistor (potentiometer) that converts the amount of vertical variation of the float into a resistance value. The method of detecting the state of the remaining amount of fuel may be suitably selected in accordance with the configuration of the shovel 100, and may be configured differently from the example illustrated in this embodiment.

Furthermore, a command value for the amount of fuel injection transmitted to the engine 11 is transmitted from the ECU 74 to the controller 30 together with the operating condition of the engine 11. The operating condition of the engine 11 and the command value for the amount of fuel injection are stored in the temporary storage part 30a of the controller 30 together with a date and time.

The controller 30 calculates fuel efficiency based on the command value for the amount of fuel injection, the date and time, etc., stored in the temporary storage part 30a. The controller 30 calculates the lifelong average fuel efficiency based on an operating time in the entire period after manufacture of the shovel 100 and the cumulative value of the amount of fuel injection in the entire period. Furthermore, the controller 30 calculates the section average fuel efficiency based on an operating time in a period after the counting of an operating time is restarted by the operator and the cumulative value of the amount of fuel injection in this period. Furthermore, the controller 30 calculates instantaneous fuel efficiency based on, for example, the amount of fuel injection in the last second. The operator may reset and restart the counting of an operating time from the menu screen displayed on the image display part 41, for example.

Furthermore, the controller 30 can calculate daily average fuel efficiency for the past few days and the fuel efficiency of each unit time (such as an hour) in each of the past few days based on the command value for the amount of fuel injection, the date and time, etc., stored in the temporary storage part 30a. Furthermore, the controller 30 can likewise calculate the average fuel efficiency of the day of work and the average fuel efficiency of each unit time of the day of work based on the command value for the amount of fuel injection, etc., stored in the temporary storage part 30a.

The various kinds of fuel efficiency information calculated by the controller 30 are transmitted to the image display unit 40 to be displayed on the image display part 41.

Furthermore, a gate lock apparatus 27 is provided in the shovel 100. The gate lock apparatus 27 is provided to prevent an improper operation of the work elements of the shovel 100, and switches the work elements of the shovel 100 to the enabled state or the disabled state.

Figure 6:
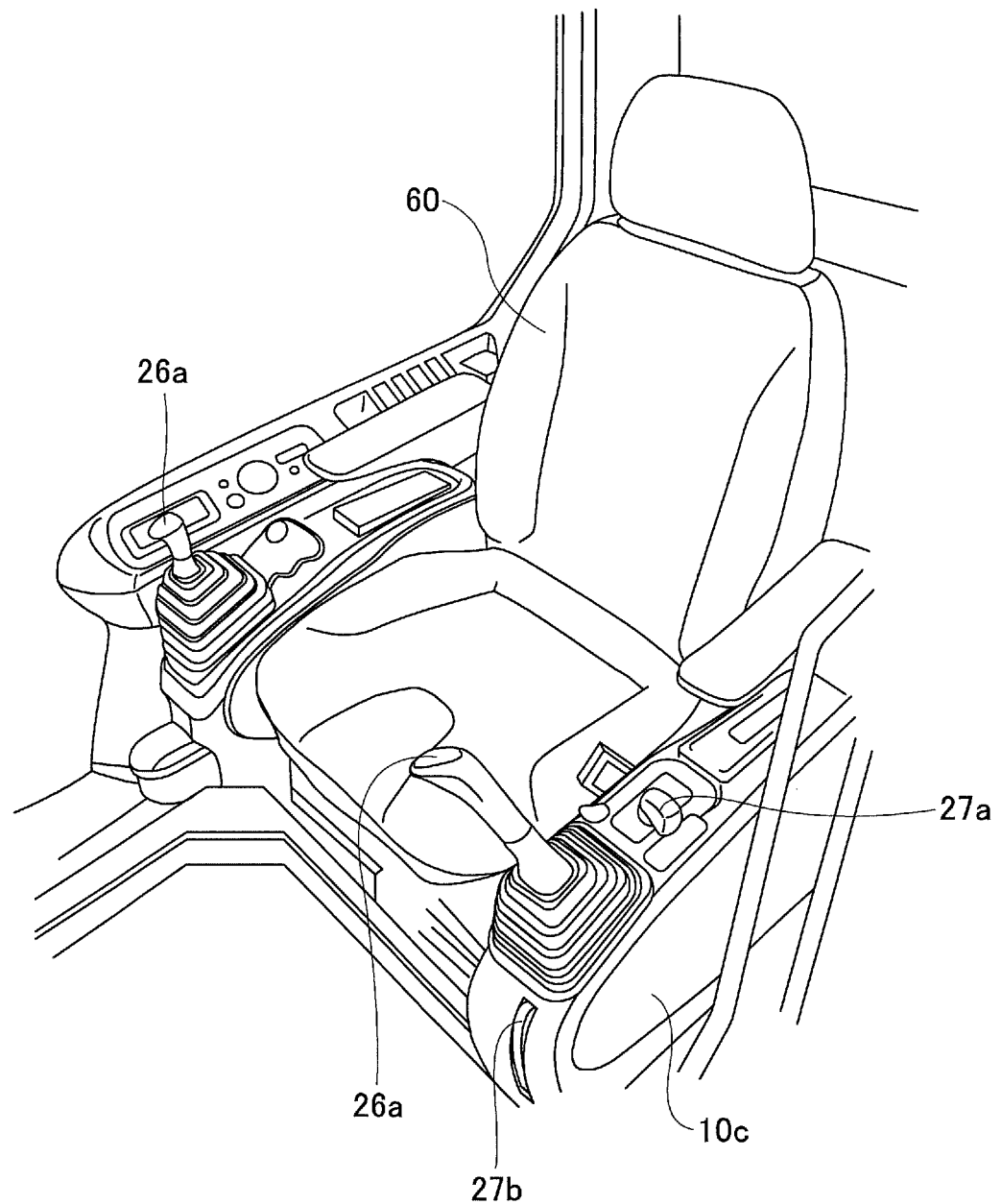
FIG. 6 is a perspective view of an operator's seat and the vicinity of the operator's seat according to the embodiment.

FIG. 6 is a perspective view of an operator's seat of the shovel 100 and the vicinity of the operator's seat according to the embodiment.

In the cabin 10, consoles 10c are provided one on each side of the operator's seat 60. Operation levers 26a are provided on the consoles 10c. The gate lock apparatus 27 is provided in the console 10c provided on the left side of the operator's seat 60, on which side the operator gets in and out of the cabin 10.

Figure 7:
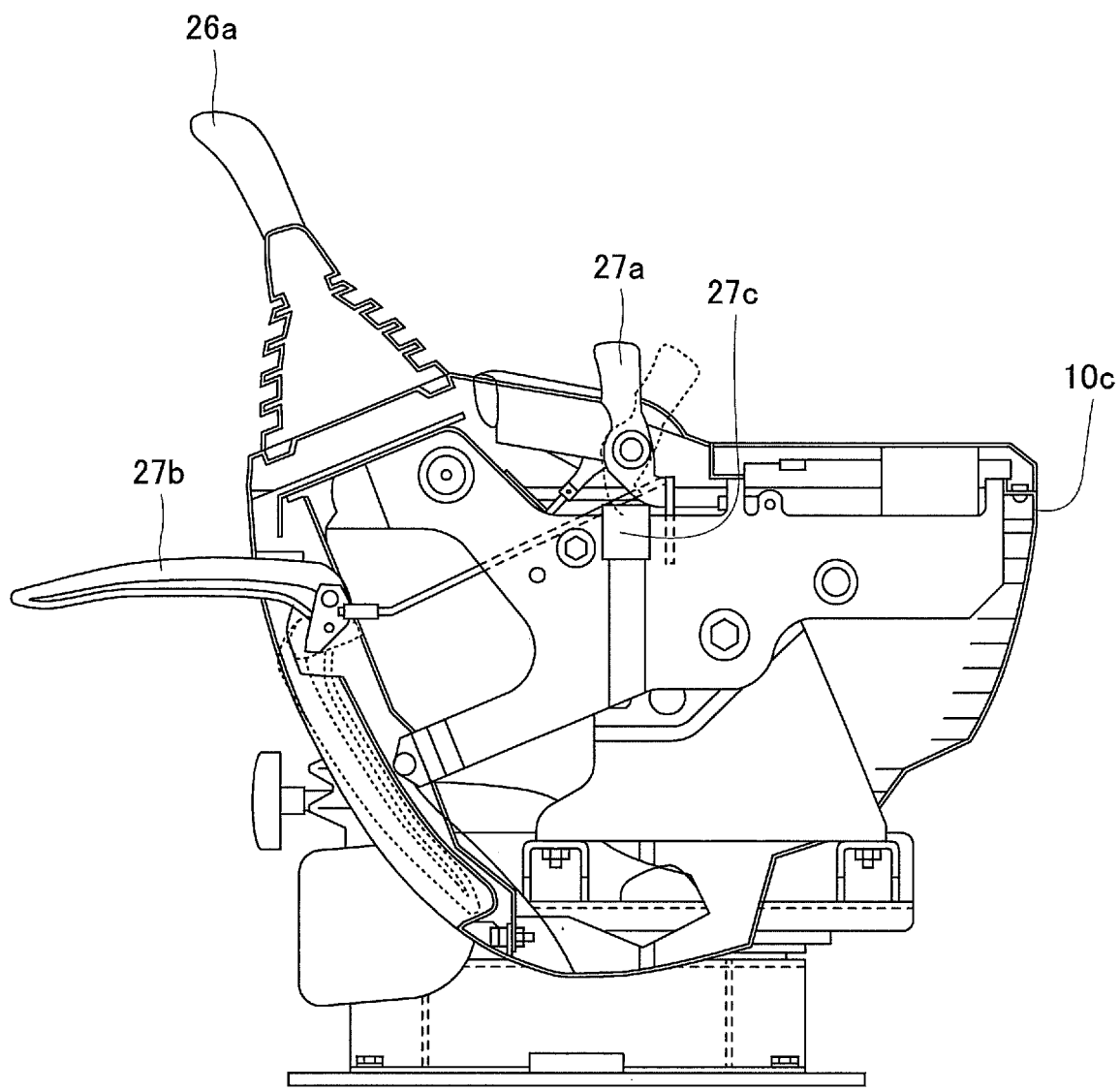
FIG. 7 is a side view of a console of the operator's seat according to the embodiment.

FIG. 7 is a side view of the console 10c on the left side of the operator's seat 60 according to the embodiment.

The gate lock apparatus 27 is disposed in the console 10c on the left side of the operator's seat 60, and includes a gate lock lever 27a, a gate 27b, and a limit switch 27c.

The gate lock apparatus 27 operates to open and close the gate 27b disposed in an area for climbing into and getting out of the operator's seat 60. The gate lock lever 27a and the gate 27b are connected with a wire. When the gate lock lever 27a is pulled up, the gate 27b also is pulled up (as indicated by a solid line). When the gate lock lever 27a is lowered, the gate 27b also is lowered (as indicated by a dashed line). The gate 27b is raised to prevent the operator from getting out of the operator's seat 60. The gate 27b is lowered to allow the operator to get out of the operator's seat 60.

The limit switch 27c is a sensor to detect an operation of the gate lock lever 27a. The gate lock lever 27a is pulled up to turn on the limit switch 27c. The gate lock lever 27a is lowered to turn off the limit switch 27c.

The limit switch 27c turns on to turn on a relay 28a of a shutoff valve 28 depicted in FIG. 5. The limit switch 27c turns off to turn off the relay 28a. Thus, the limit switch 27c turns on and off to perform the switching of the shutoff valve 28 that interrupts the transmission of hydraulic fluid from the pilot pump 15 to the operation apparatus 26.

When the operator is seated on the operator's seat 60 and the gate lock lever 27a is pulled up (the gate 27b is raised to prevent the operator from getting off), the limit switch 27c turns on to turn on the relay 28a, so that the shutoff valve 28 is opened to enable the work elements of the shovel 100. When the operator is seated on the operator's seat 60 but the gate lock lever 27a is lowered (the gate 27b is lowered to allow the operator to get on and off), the limit switch 27c turns off to turn off the relay 28a, so that the shutoff valve 28 is closed to disable the work elements of the shovel 100.

Thus, according to the shovel 100, the work elements are not enabled unless the operator is seated on the operator's seat 60 and pulls up the gate lock lever 27a. Furthermore, when the gate lock lever 27a is lowered to allow the operator to get into and out of the operator's seat 60, the work elements are disabled. Thus, the gate lock apparatus 27 prevents an improper operation of the shovel 100.

A signal representing the on or off of the limit switch 27c of the gate lock apparatus 27 is also input to the controller 30. The controller 30 serves as a detector to detect the enabled state or the disabled state of the work elements based on the signal from the limit switch 27c.

Figure 8:
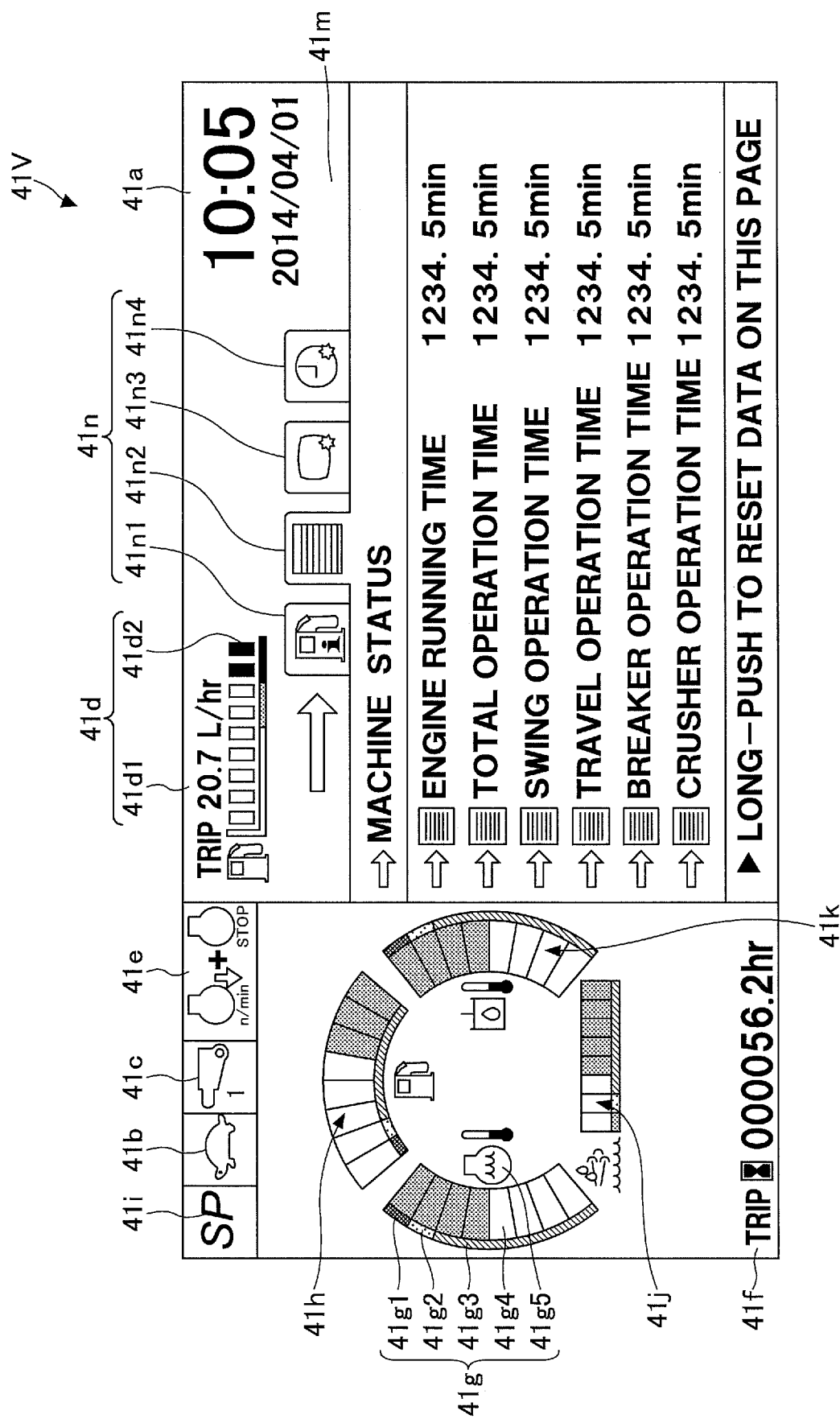
FIG. 8 is a diagram depicting a display screen displayed on the image display unit.

Next, a configuration of a display screen displayed on the image display part 41 of the image display unit 40 is described. FIG. 8 is a diagram depicting a display screen 41V displayed on the image display part 41 by way of example.

As depicted in FIG. 8, the display screen 41V includes a date and time display area 41a, a traveling mode display area 41b, an attachment display area 41c, a fuel efficiency display area 41d, an engine control state display area 41e, an engine operating time display area 41f, a coolant water temperature display area 41g, a remaining fuel amount display area 41h, a rotational speed mode display area 41i, a remaining urea water amount display area 41j, a hydraulic oil temperature display area 41k, and a menu/camera image display area 41m. According to the display screen 41V depicted by way of example in FIG. 8, a menu screen is displayed on the menu/camera image display area 41m.

The date and time display area 41a is an area to display a current date and time. According to the example depicted in FIG. 8, digital display is employed to show a date (Apr. 1, 2014) and a time (10:05).

The traveling mode display area 41b is an area to display a current traveling mode. The traveling mode represents the setting of traveling hydraulic motors using a variable displacement pump. Specifically, the traveling mode includes a low-speed mode and a high-speed mode. A "turtle"-shaped mark is displayed in the low-speed mode, and a "rabbit"-shaped mark is displayed in the high-speed mode. According to the example depicted in FIG. 8, the "turtle"-shaped mark is displayed to make it possible for the operator to recognize that the low-speed mode is set.

The attachment display area 41c is an area to display an image that represents a currently attached attachment. Various attachments such as a bucket, a rock drill, a grapple, and a lifting magnet are attached to the shovel 100. The attachment display area 41c displays, for example, marks shaped like these attachments and numbers corresponding to the attachments. According to the example depicted in FIG. 8, a rock drill-shaped mark is displayed and "1" is displayed as a number representing the magnitude of the output of the rock drill.

The fuel efficiency display area 41d is an area to display fuel efficiency information calculated by the controller 30. The fuel efficiency display area 41d includes an average fuel efficiency display area 41d1 to display the lifelong average fuel efficiency or the section average fuel efficiency and an instantaneous fuel efficiency display area 41d2 to display the instantaneous fuel efficiency.

According to the example depicted in FIG. 8, the section average fuel efficiency is numerically displayed together with a unit of [L/hr (litter per hour)] in the average fuel efficiency display area 41d1. Furthermore, a bar graph composed of nine segments that are individually controlled to light up or darken in accordance with the magnitude of the instantaneous fuel efficiency is displayed in the instantaneous fuel efficiency display area 41d2. The segments are controlled to increase the number of lighted segments as the instantaneous fuel efficiency increases and to decrease the number of lighted segments as the instantaneous fuel efficiency decreases, so that the operator can visually recognize the magnitude of the instantaneous fuel efficiency.

The engine operating time display area 41f is an area to display the cumulative operating time of the engine 11. According to the example depicted in FIG. 8, a cumulative operating time since the restart of counting by the operator is displayed together with a unit of "hr (hour)." At least one of the lifelong operating time in the entire period after manufacture of the shovel 100 and the section operating time since the restart of counting by the operator is displayed in the engine operating time display area 41f.

When the operator depresses the operating time display change switch 42c, the fuel efficiency information displayed in the average fuel efficiency display area 41d1 is changed together with the operating time information displayed in the engine operating time display area 41f. For example, when the section operating time is displayed in the engine operating time display area 41f, the section average fuel efficiency is displayed in the average fuel efficiency display area 41d1. When the lifelong operating time is displayed in the engine operating time display area 41f, the lifelong average fuel efficiency is displayed in the average fuel efficiency display area 41d1. When both the section operating time and the lifelong operating time are displayed in the engine operating time display area 41f, both the section average fuel efficiency and the lifelong average fuel efficiency are displayed in the average fuel efficiency display area 41d1.

Thus, every time the operating time display change switch 42c is depressed, the fuel efficiency information displayed in the average fuel efficiency display area 41d1 switches to "the section average fuel efficiency," "the lifelong average fuel efficiency," or "the section average fuel efficiency and the lifelong average fuel efficiency." Accordingly, by depressing the operating time display change switch 42c, the operator can understand the section average fuel efficiency and the lifelong average fuel efficiency to determine whether the state of fuel efficiency in current work is good or not to proceed with work in such a manner as to further improve the fuel efficiency.

The lifelong average fuel efficiency or the section average fuel efficiency displayed in the average fuel efficiency display area 41d1 may be displayed in a unit different from the example depicted in FIG. 8, and may be displayed in a bar graph. The instantaneous fuel efficiency may be numerically displayed in the instantaneous fuel efficiency display area 41d2.

The engine control state display area 41e is an area to display the state of control of the engine 11. According to the example depicted in FIG. 8, "automatic deceleration and automatic stop mode" is selected as the state of control of the engine 11. The "automatic deceleration and automatic stop mode" means the state of control to automatically reduce the engine rotational speed and further to automatically stop the engine 11 in accordance with the duration of the low-load state of the engine 11. Other states of control of the engine 11 include "automatic deceleration mode," "automatic stop mode," and "manual deceleration mode."

The coolant water temperature display area 41g is an area to display a current temperature condition of the engine coolant water. According to the example depicted in FIG. 8, a bar graph that represents the temperature condition of the engine coolant water is displayed. The temperature of the engine coolant water is displayed based on the output data of a water temperature sensor 11c attached to the engine 11. Specifically, the coolant water temperature display area 41g includes an abnormal range indicator 41g1, a caution range indicator 41g2, a normal range indicator 41g3, a segment indicator 41g4, and an icon indicator 41g5.

The abnormal range indicator 41g1, the caution range indicator 41g2, and the normal range indicator 41g3 are indicators for notifying the operator that the temperature of the engine coolant water is abnormally high, requires attention, and is normal, respectively. The segment indicator

41g4 is an indicator for notifying the operator of the level of the temperature of the engine coolant water. The icon indicator 41g5 is an icon, such as a graphic symbol, indicating that the abnormal range indicator 41g1, the caution range indicator 41g2, the normal range indicator 41g3, and the segment indicator 41g4 are indicators pertaining to the temperature of the engine coolant water. The icon indicator 41g5 may alternatively be characters indicating that the indicators are related to the temperature of the engine coolant water.

According to the example depicted in FIG. 8, the segment indicator 41g4 is composed of eight segments that are individually controlled to light up or darken, and the number of lighted segments increases as the coolant temperature increases. According to the example depicted in FIG. 8, four segments are lighted. While the temperatures represented by the individual segments are equal in width in the example depicted in FIG. 8, the width of temperatures may differ from segment to segment.

Furthermore, according to the example depicted in FIG. 8, the abnormal range indicator 41g1, the caution range indicator 41g2, and the normal range indicator 41g3 are arc-shaped graphics successively arranged along the segment indicator 41g4 to be constantly lighted in, for example, red, yellow, and green, respectively. According to the segment indicator 41g4, the first (lowest) through sixth segments belong to the normal range, the seventh segment belongs to the caution range, and the eighth (highest) segment belongs to the abnormal range.

Instead of displaying the abnormal range indicator 41g1, the caution range indicator 41g2, and the normal range indicator 41g3 in arc-shaped graphics, the coolant water temperature display area 41g may display characters, symbols, etc., indicating an abnormal level, a caution level, and a normal level at their respective boundaries.

The above-described configuration including an abnormal range indicator, a caution range indicator, a normal range indicator, a segment indicator, and an icon indicator is also adopted for the remaining fuel amount display area 41h, the remaining urea water amount display area 41j, and the hydraulic oil temperature display area 41k. Instead of displaying arc-shaped graphics representing an abnormal range, a caution range, and a normal range, the remaining fuel amount display area 41h and the remaining urea water amount display area 41j may display a letter "F" or a black circle (a circle filled with black), indicating "Full (full state)", a letter "E" or a white circle (an unfilled circle), indicating "Empty (empty state)", etc., at their respective boundaries.

The remaining fuel amount display area 41h is an area to display the state of the remaining amount of fuel stored in the fuel tank 55. According to the example depicted in FIG. 8, a bar graph representing the current state of the remaining amount of fuel is displayed. The remaining amount of fuel is displayed based on the output data of the remaining fuel amount sensor 55a.

The rotational speed mode display area 41i is an area to display, as an image, a current rotational speed mode set with the engine rotational speed adjustment dial 75. The rotational speed mode includes, for example, the above-described four modes, namely, SP mode, H mode, A mode, and idling mode. According to the example depicted in FIG. 8, a symbol "SP" indicating SP mode is displayed.

The remaining urea water amount display area 41j is an area to display, as an image, the state of the remaining amount of urea water stored in a urea water tank. According to the example depicted in FIG. 8, a bar graph representing the current state of the remaining amount of urea water is displayed. The remaining amount of urea water is displayed based on the output data of a remaining urea water amount sensor provided in the urea water tank.

The hydraulic oil temperature display area 41k is an area to display the state of the temperature of hydraulic oil in a hydraulic oil tank. According to the example depicted in FIG. 8, a bar graph indicating the state of the temperature of hydraulic oil is displayed. The temperature of hydraulic oil is displayed based on the output data of the oil temperature sensor 14c.

Furthermore, according to the example depicted in FIG. 8, the coolant water temperature display area 41g, the remaining fuel amount display area 41h, the remaining urea water amount display area 41j, and the hydraulic oil temperature display area 41k have their respective segment indicators displayed to extend or shrink along the circumferential direction of the same single predetermined circle. Specifically, the coolant water temperature display area 41g, the remaining fuel amount display area 41h, the remaining urea water amount display area 41j, and the hydraulic oil temperature display area 41k are positioned in the left-side portion, the upper portion, the lower portion, and the right-side portion, respectively, of the predetermined circle. In the coolant water temperature display area 41g and the hydraulic oil temperature display area 41k, an abnormal range indicator, a caution range indicator, and a normal range indicator are arranged in this order from the top. In the remaining fuel amount display area 41h and the remaining urea water amount display area 41j, an abnormal range indicator, a caution range indicator, and a normal range indicator are arranged in this order from the left. Furthermore, in the remaining fuel amount display area 41h and the remaining urea water amount display area 41j, the segment indicator is displayed to increase the number of lighted segments as the remaining amount increases, where the first (rightmost) through sixth segments belong to a normal range, the seventh segment belongs to a caution range, and the eighth (leftmost) segment belongs to an abnormal range.

The coolant water temperature display area 41g, the remaining fuel amount display area 41h, the remaining urea water amount display area 41j, and the hydraulic oil temperature display area 41k may adopt needle display in lieu of bar graph display.

The menu/camera image display area 41m is an area to display a menu screen or a captured image captured with the image capturing devices 80. According to the example depicted in FIG. 8, a menu screen is displayed in the menu/camera image display area 41m. The menu screen is displayed in the menu/camera image display area 41m when the operator depresses the menu switch 42a.

During execution of work by the shovel 100, a captured image captured with the image capturing devices 80 is preferably displayed in the menu/camera image display area 41m to allow the operator to check the surroundings.

As depicted in FIG. 8, the menu screen includes multiple tabs 41n, and the contents of the selected tab 41n are displayed. The tabs 41n include a fuel efficiency information tab 41n1, a status tab 41n2, a display setting tab 41n3, and a date and time setting tab 41n4.

The fuel efficiency information tab 41n1 is selected by the operator to display various kinds of fuel efficiency information. The status tab 41n2 is selected to display an engine running time, a total operation time, a swing operation time, a travel operation time, a breaker operation time, a crusher operation time, etc., as depicted in FIG. 8. According to the status tab 41n2, each time is resettable. The display setting tab 41n3 is selected to display settings such as the brightness and the contrast of the image display part 41 of the image display unit 40 and receive changes to the settings made by the operator. The date and time setting tab 41n4 is selected to display a date and time to allow the operator to set the date and time. The tabs 41n are not limited to the above-described examples, and a tab to display other information may be provided.

The operator uses, for example, the operation switch 42d of the operation part 42, which includes vertically and laterally separated four switches, to select a tab 41n and input settings. The operator uses the upper, lower, left and right switches of the operation switch 42d to select a tab 41n, a setting item, etc. Furthermore, after selection of a setting item, a setting value may be changed using the upper or lower switch of the operation switch 42d.

Figure 9:
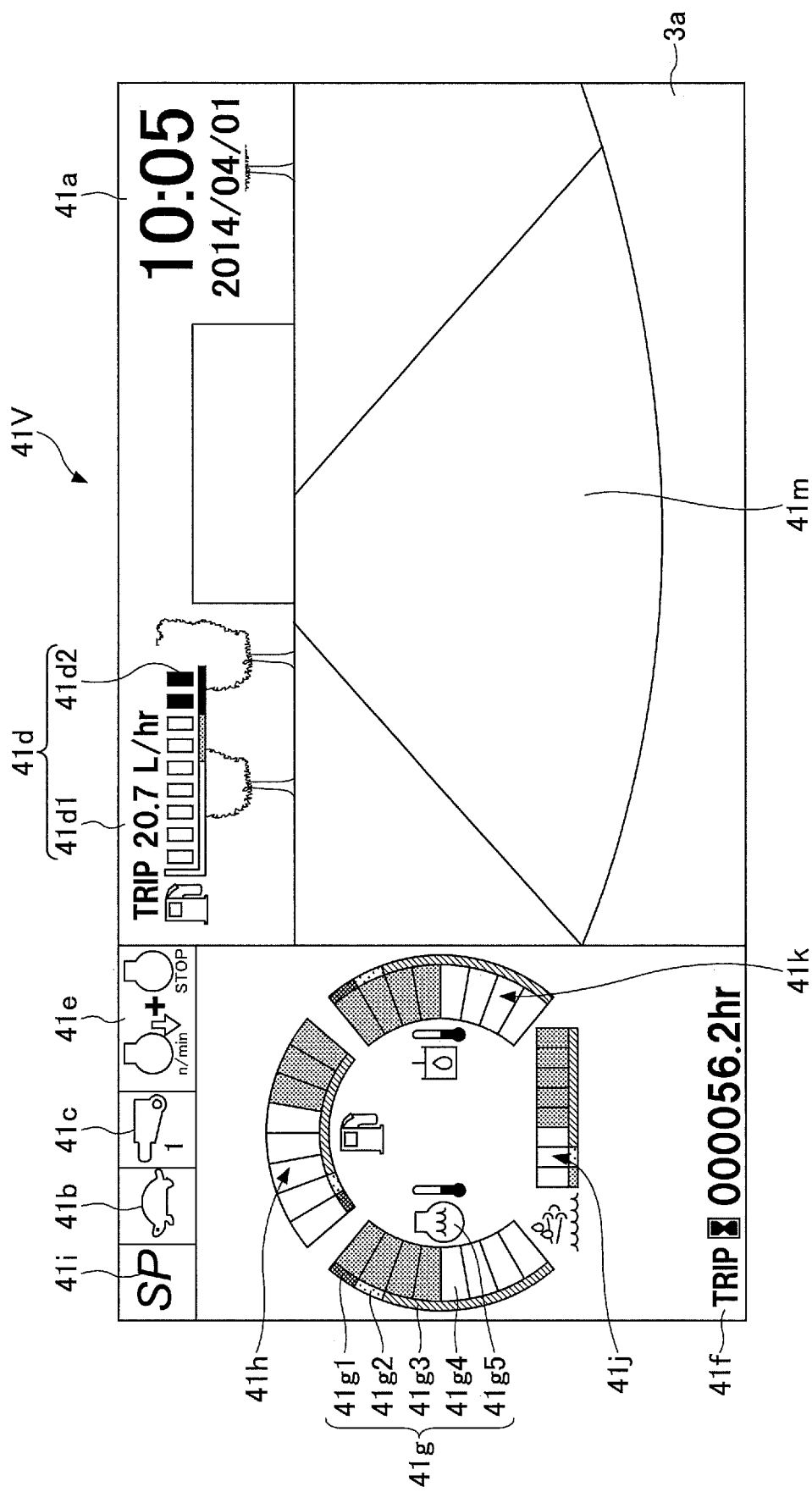
FIG. 9 is a diagram depicting a display screen displayed on the image display unit.

The camera switch 42b is depressed by the operator to display a camera image captured with the image capturing devices 80 in the menu/camera image display area 41m. FIG. 9 is a diagram depicting an example of the display screen 41V on which a captured image captured with the rear monitoring camera 80B is displayed.

Here, when the camera switch 42b is depressed during display of a captured image captured with the rear monitoring camera 80B in the menu/camera image display area 41m as depicted in FIG. 9, the displayed captured image switches to that of the left-side monitoring camera 80L or the right-side monitoring camera 80R. Likewise, when the camera switch 42b is depressed during display of a captured image captured with the right-side monitoring camera 80R in the menu/camera image display area 41m as depicted in FIG. 9, the displayed captured image switches to that of the left-side monitoring camera 80L or the rear monitoring camera 80B. Furthermore, when the camera switch 42b is depressed during display of a captured image captured with the left-side monitoring camera 80L in the menu/camera image display area 41m as depicted in FIG. 9, the displayed captured image switches to that of the right-side monitoring camera 80R or the rear monitoring camera 80B.

Furthermore, multiple images captured with the rear monitoring camera 80B, the left-side monitoring camera 80L, and the right-side monitoring camera 80R may be displayed in the menu/camera image display area 41m. For example, an image captured with the rear monitoring camera 80B may be displayed in a left-side area and an image captured with the right-side monitoring camera 80R may be displayed in a right-side area of the menu/camera image display area 41m. Alternatively, an image captured with the rear monitoring camera 80B may be displayed in the right-side area and an image captured with the left-side monitoring camera 80L may be displayed in the left-side area. As yet another alternative, an image captured with the right-side monitoring camera 80R may be displayed in a right-side area, an image captured with the rear monitoring camera 80B may be displayed in a center area, and an image captured with the left-side monitoring camera 80L may be displayed in a left-side area.

Alternatively, a bird's-eye view image into which images captured with the rear monitoring camera 80B, the left-side monitoring camera 80L, and the right-side monitoring camera 80R are combined may be displayed in the menu/camera image display area 41m.

Captured images captured with the multiple image capturing devices 80 are thus displayed in the menu/camera image display area 41m to allow the operator to perform work while checking the surroundings of the shovel 100 more extensively.

A captured image displayed in the menu/camera image display area 41m of the image display part 41 is displayed independently of the traveling direction of the lower-part traveling body 1 of the shovel 100. That is, a selected captured image or a composite bird's-eye view image from the rear monitoring camera 80B, the left-side monitoring camera 80L, and the right-side monitoring camera 80R is displayed in the menu/camera image display area 41m regardless of the traveling direction of the lower-part traveling body 1.

Each camera is so installed as to include part of the cover 3a of the upper-part turning body 3 in a captured image. Inclusion of part of the cover 3a in a displayed image makes it easy for the operator to feel the distance between an object displayed in the menu/camera image display area 41m and the shovel 100.

The size and placement of each display area on the display screen 41V may be changed as desired. Furthermore, one or more of the display areas 41a through 41n may be omitted from the display screen 41V, and the display screen 41V may include display areas other than those described above. For example, the display screen 41V may include an exhaust gas filter condition display area to display the condition of clogging of an exhaust gas filter (such as a Diesel Particulate Filter [DPF]). Specifically, the exhaust gas filter condition display area may display a bar graph that represents the ratio of the current time of use of the exhaust gas filter to its maximum allowable time of use.

Here, preferably, an image captured with the image capturing devices 80 is preferentially displayed in the menu/camera image display area 41m when the gate lock lever 27a is pulled up by the operator to enable the work elements of the shovel 100 in the shovel 100. For example, the image display unit 40 switches the display of the menu/camera image display area 41m from the menu screen to an image captured with the image capturing devices 80 in response to the gate lock lever 27a being pulled up to turn on the limit switch 27c to enable the work elements.

Because a captured image is preferentially displayed when the gate lock lever 27a is pulled up to enable the work elements, the operator can smoothly start work while confirming the safety of the surroundings without operating the camera switch 42b or the like.

Furthermore, the image displayed in the menu/camera image display area 41m when the gate lock lever 27a is pulled up is preferably equal to the image displayed when the gate lock lever 27a was pulled down to end or interrupt work the last time. For example, in response to having displayed an image captured with the rear monitoring camera 80B at the end or interruption of work the last time, the image display unit 40 again displays an image captured with the rear monitoring camera 80B at the start of work. Likewise, in response to having displayed an image captured with the left-side monitoring camera 80L at the end or interruption of work the last time, the image display unit 40 displays an image captured with the left-side monitoring camera 80L also at the start of work. Furthermore, in response to having displayed an image captured with the right-side monitoring camera 80R at the end or interruption of work the last time, the image display unit 40 displays an image captured with the right-side monitoring camera 80R also at the start of work.

Furthermore, in response to having simultaneously displayed images captured with two or more of the rear monitoring camera 80B, the left-side monitoring camera 80L, and the right-side monitoring camera 80R at the end or interruption of work, the image display unit 40 likewise displays multiple captured images at the start of work. Furthermore, in response to having displayed a composite bird's-eye view image of images captured with the rear monitoring camera 80B, the left-side monitoring camera 80L, and the right-side monitoring camera 80R at the end or interruption of work, the image display unit 40 displays a like bird's-eye view image at the start of work.

An image displayed at the end or interruption of work the last time is automatically displayed on the image display unit 40 at the start of work to allow the operator to more smoothly start work while confirming the safety of the surroundings without operating the camera switch 42b or the like.

Furthermore, a captured image captured with the image capturing devices 80 is preferably displayed in the menu/camera image display area 41m during operation of the shovel 100 by the operator to allow the operator to confirm the safety of the surroundings of the shovel 100. Therefore, according to the shovel 100 of this embodiment, a warning is displayed on the image display part 41 of the image display unit 40 when the operator depresses the menu switch 42a while operating the shovel 100.

Figure 10:
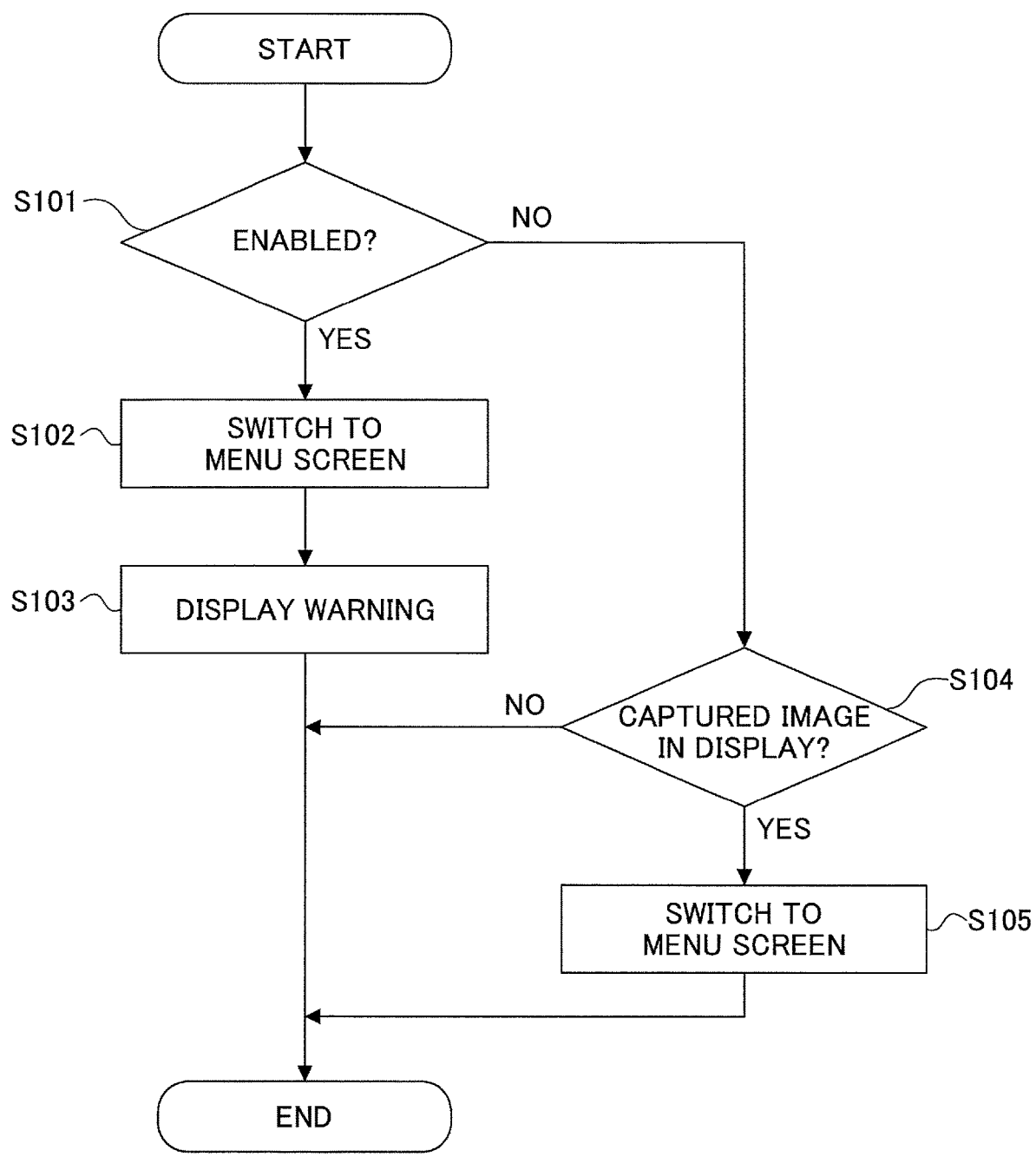
FIG. 10 is a diagram depicting a flowchart of a menu switch operating process according to the embodiment.

FIG. 10 is a diagram depicting a flowchart of a menu switch operating process according to the embodiment.

When the operator depresses the menu switch 42a, first, at step S101, the controller 30 detects whether the work elements of the shovel 100 are enabled based on a signal transmitted from the limit switch 27c of the gate lock apparatus 27.

If the work elements are enabled (YES at step S101), at step S102, the image display unit 40 switches the menu/camera image display area 41m to a menu screen, and at step S103, displays a warning on the menu screen.

Figure 11:
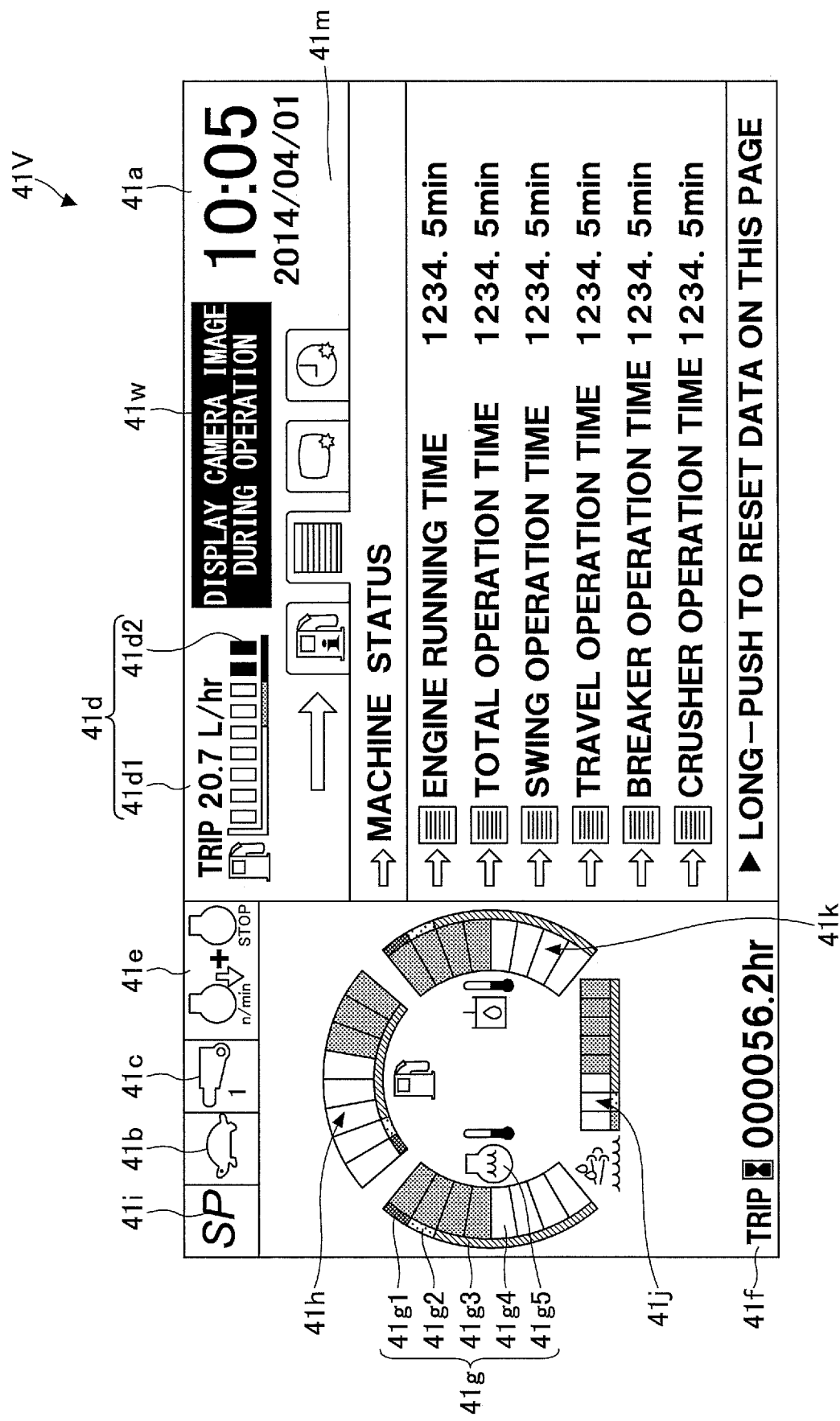
FIG. 11 is a diagram depicting a display screen displayed on the image display unit.

FIG. 11 is a diagram depicting an example of the display screen 41V where a menu screen is displayed in the menu/camera image display area 41m and a warning 41w is displayed on the menu screen.

When the operator depresses the menu switch 42a with the work elements of the shovel 100 being enabled, a menu screen is displayed and the warning 41w that "DISPLAY CAMERA IMAGE DURING OPERATION" is displayed on the menu screen. The warning 41w is thus displayed to urge the operator to depress the camera switch 42b to display a captured image captured with the image capturing devices 80 in the menu/camera image display area 41m and confirm the safety of the surroundings.

Referring back to the flowchart of FIG. 10, if the controller 30 detects that the work elements are disabled (NO at step S101), at step S104, the image displayed on the image display unit 40 is checked.

If a captured image is displayed on the image display unit 40 (YES at step S104), at step S105, the image display unit 40 switches the image displayed in the menu/camera image display area 41m to the menu screen. If the menu screen is displayed on the image display unit 40 (No at step S104), the process ends as is because there is no need to display a warning because of the disability of the work elements and the menu screen is already displayed in the menu/camera image display area 41m.

Thus, when the menu screen is displayed while the work elements of the shovel 100 are enabled, the warning 41w is displayed on the menu screen to cause the operator to display a captured image captured with the image capturing devices 80. By the warning 41w, the operator is urged to display a captured image to confirm the safety of the surroundings during operation and is cautioned to safely perform work.

Alternatively, when the operator depresses the menu switch 42a while the work elements are enabled, a warning may be displayed during display of a captured image instead of the menu screen being immediately displayed in the menu/camera image display area 41m.

Figure 12:
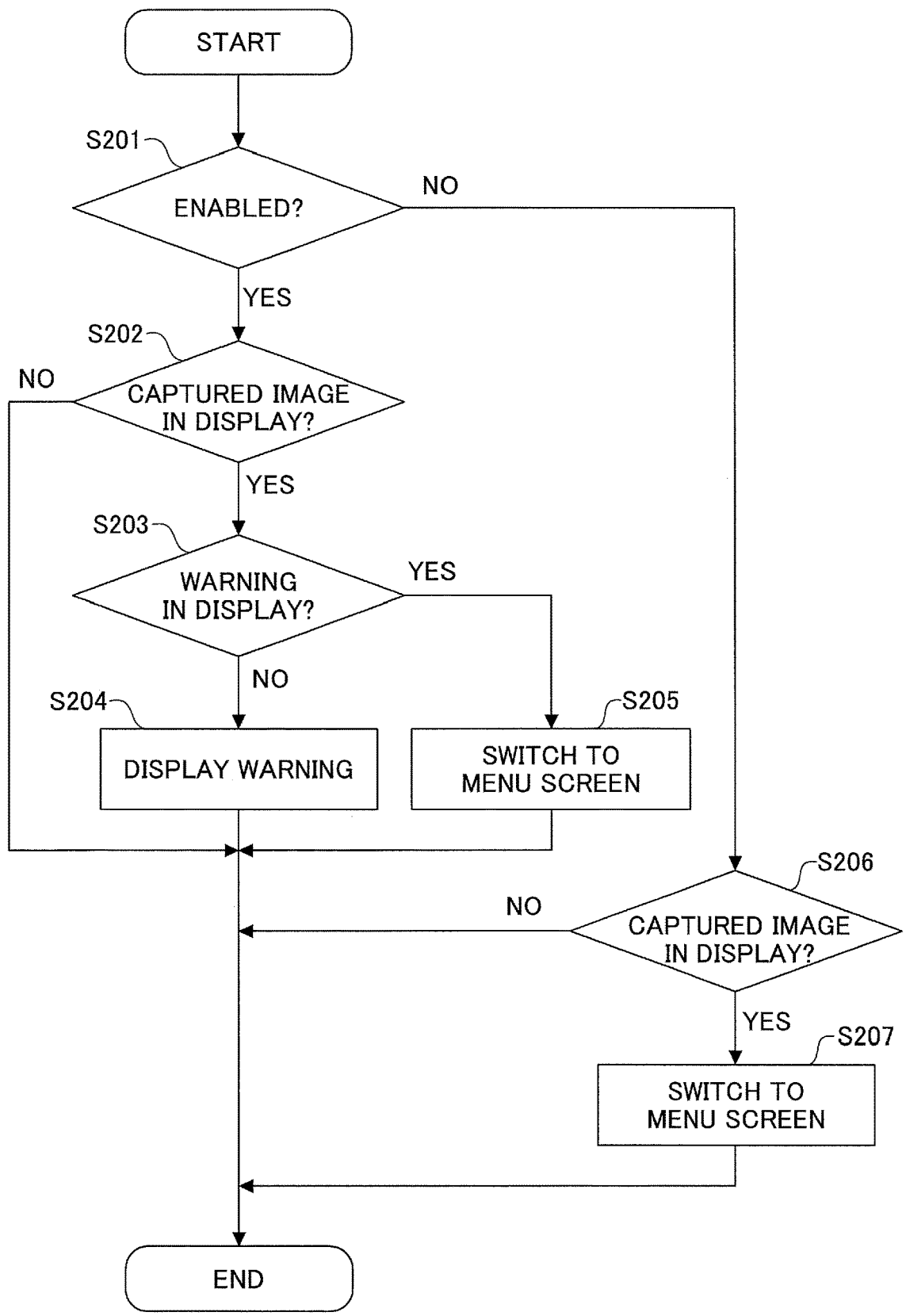
FIG. 12 is a diagram depicting a flowchart of a menu switch operating process according to the embodiment.

FIG. 12 is a diagram depicting a flowchart of a menu switch operating process to display a warning during display of a captured image.

When the operator depresses the menu switch 42a, first, at step S201, the controller 30 detects whether the work elements of the shovel 100 are enabled based on a signal transmitted from the limit switch 27c of the gate lock apparatus 27.

If the work elements are enabled (YES at step S201), at step S202, the image displayed on the image display unit 40 is checked. If a captured image captured with the image capturing devices 80 is displayed on the image display unit 40 (YES at step S202), at step S203, it is determined whether a warning is displayed on the image display unit 40. If no warning is displayed on the image display unit 40 (NO at step S203), at step S204, the image display unit 40 displays a warning on the captured image to end the process.

Figure 13:
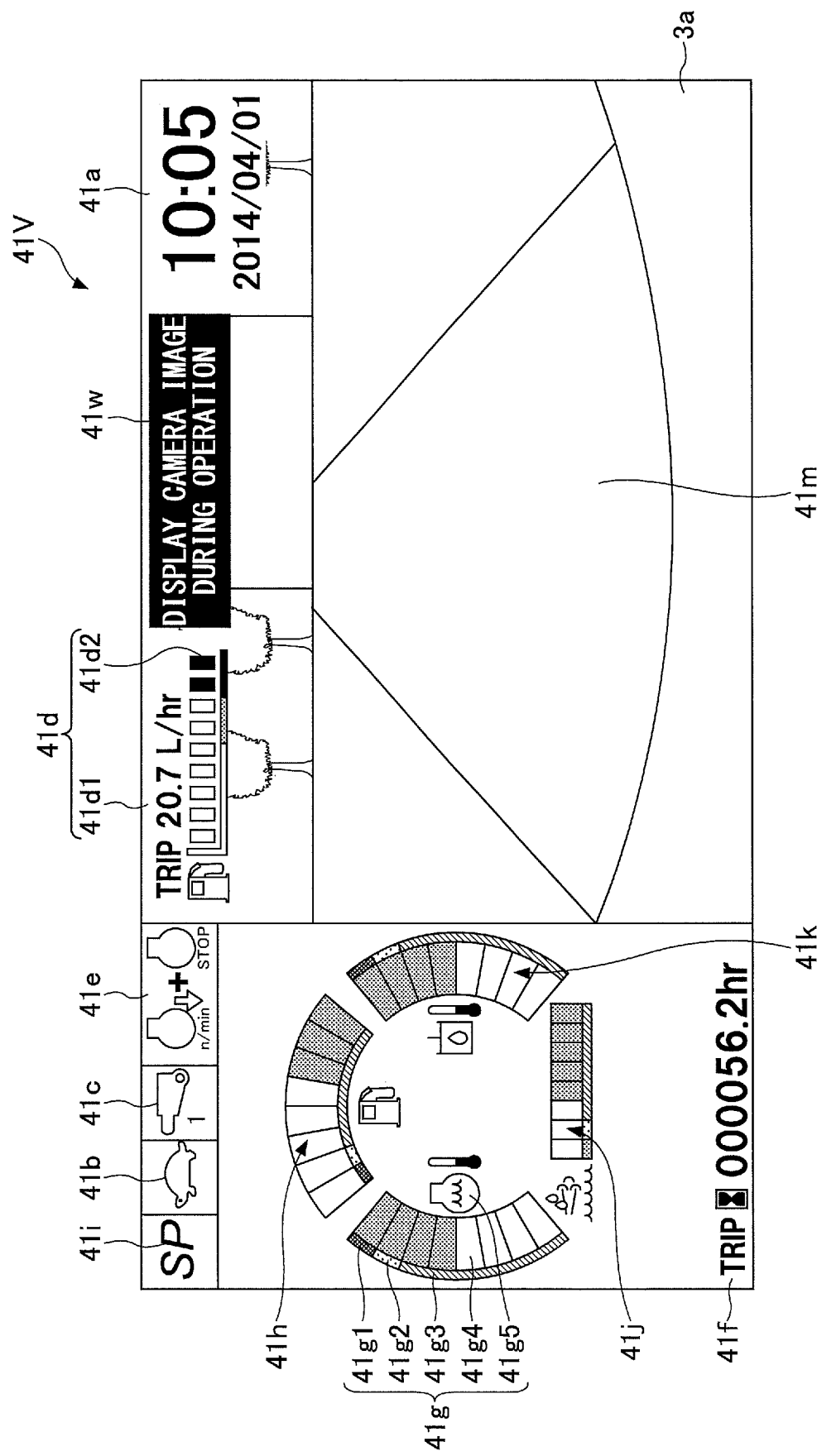
FIG. 13 is a diagram depicting a display screen displayed on the image display unit.

FIG. 13 is a diagram depicting an example of the display screen 41V where a captured image is displayed in the menu/camera image display area 41m and the warning 41W is displayed on the captured image.

When the operator depresses the menu switch 42a while the work elements of the shovel 100 are enabled and a captured image is displayed on the image display unit 40, the warning 41w is displayed on the captured image as depicted in FIG. 13. Thus, a single depression of the menu switch 42a does not immediately display the menu screen but displays the warning 41w on the captured image. The warning 41w is thus displayed to urge the operator to continue to display the captured image to confirm the safety of the surroundings.

Referring back to the flowchart of FIG. 12, when the warning 41w is already displayed on the image display unit 40 (YES at step S203), at step S205, the menu/camera image display area 41m is switched to the menu screen to end the process.

Thus, when the menu switch 42a is depressed (for the first time) during display of a captured image, the warning 41w is displayed on the captured image. When the menu switch 42a is again depressed (for the second time) in this state, the menu/camera image display area 41m is switched to the menu screen. The warning 41w may continue to be displayed on the menu screen after the switching.

When the work elements are enabled, the operator is prevented from displaying the menu screen unless depressing the menu switch 42a twice in the state where a captured image is displayed, and accordingly, is strongly urged to display the captured image to confirm the safety of the surroundings.

If the controller 30 detects that the work elements are disabled (NO at step S201), at step S206, the image displayed on the image display unit 40 is checked.

If a captured image is displayed on the image display unit 40 (YES at step S206), at step S207, the image display unit 40 switches the image displayed in the menu/camera image display area 41m to the menu screen. If the menu screen is displayed on the image display unit 40 (NO at step S206), the process ends as is because there is no need to display a warning because of the disability of the work elements and the menu screen is already displayed in the menu/camera image display area 41m.

Thus, the image display unit 40 may be disabled from displaying the menu screen unless the menu switch 42a is depressed twice when a captured image is displayed while the work elements are enabled. The operator is strongly urged to display a captured image to confirm the safety of the surroundings during operation. Accordingly, the operator is less likely to erroneously perform operations while looking at the menu screen.

When the operator pulls down the gate lock lever 27a to disable the work elements of the shovel 100 during display of the warning 41w on the menu screen or on a captured image, the warning 41w is cleared and the menu screen is displayed.

As described above, according to the shovel 100 of this embodiment, when the menu switch 42a is depressed while the work elements are enabled, a warning is displayed to urge the operator to display a captured image, thereby increasing the safety awareness of the operator to ensure work safety. While a shovel is described as an embodiment, the present invention is not limited to shovels, and may be applied to other construction machines.

While a construction machine and a method of controlling a construction machine according to the embodiment are described above, the present invention is not limited to the above-described embodiment, and variations and modifications may be made within the scope of the present invention.

What is claimed is:

1. A construction machine, comprising:
    a camera configured to capture an image of surroundings;
    a display mounted in an operator's cab and configured to display a menu screen showing an operating condition and various settings, or the captured image captured with the camera;
    a menu switch; and
    a hardware processor configured to switch an image displayed on the display to the menu screen when the menu switch is operated, and to detect whether a work element is enabled or disabled based on an operation of a gate lock lever,
    wherein an operation of the menu switch during display of the captured image while the work element is enabled by the operation of the gate lock lever causes the hardware processor to display a warning on the display.

2. The construction machine as claimed in claim 1, wherein another operation of the menu switch subsequent to the operation of the menu switch during the display of the captured image while the work element is enabled causes the hardware processor to display the menu screen together with the warning on the display.

3. The construction machine as claimed in claim 1, wherein the operation of the menu switch during the display of the captured image while the work element is enabled causes the hardware processor to display the warning on the captured image.

4. The construction machine as claimed in claim 3, wherein another operation of the menu switch during display of the warning together with the captured image causes the hardware processor to display the menu screen together with the warning on the display.

5. The construction machine as claimed in claim 1, wherein the hardware processor is configured to clear the warning and display the menu screen when the work element becomes disabled while the warning is displayed.

6. The construction machine as claimed in claim 1, further comprising:
    a control valve configured to control hydraulic oil supplied from a hydraulic pump to the work element that is a hydraulic actuator driven with the supplied hydraulic oil;
    an operation apparatus connected to a pilot pump via a pilot line to supply the hydraulic oil supplied from the pilot pump to the control valve at a hydraulic pressure commensurate with an amount of operation;
    a shutoff valve provided in the pilot line and configured to interrupt transmission of the hydraulic oil from the pilot pump to the operation apparatus; and
    a gate lock apparatus configured to control the shutoff valve in accordance with the operation of the gate lock lever.

7. The construction machine as claimed in claim 1, wherein the hardware processor is configured to preferentially display the captured image when the work element is enabled.

8. The construction machine as claimed in claim 1, wherein the hardware processor is configured to display the captured image independently of a traveling direction of a lower-part traveling body.

9. The construction machine as claimed in claim 1, further comprising:
    a limit switch provided in the operator's cab and configured to turn, on and off in accordance with the operation of the gate lock lever provided in the operator's cab, and to transmit a signal representing an on-off state of the limit switch to the hardware processor,
    wherein the hardware processor is configured to detect whether the work element is enabled or disabled based on the signal transmitted from the limit switch, in response to the operation of the menu switch.

10. The construction machine as claimed in claim 1, wherein the warning urges confirmation of safety of the surroundings.

11. The construction machine as claimed in claim 10, wherein the warning urges display of the captured image captured with the camera.

12. The construction machine as claimed in claim 1, wherein
    the warning is displayed on the menu screen, and
    the warning urges the captured image captured with the camera to be displayed.

13. The construction machine as claimed in claim 1, wherein the menu screen shows a screen related to at least one of fuel efficiency information, status information, a display setting, and a date and time setting.

14. The construction machine as claimed in claim 1, wherein the hardware processor is configured to switch the image displayed on the display from the captured image to the menu screen when the menu switch is operated.

15. The construction machine as claimed in claim 1, wherein
    a display screen displayed on the display includes a first area and a second area, and
    the hardware processor is configured to switch the image displayed in the first area of the display screen from the captured image to the menu screen while keeping information items that have been displayed in the second area of the display screen, when the menu switch is operated.

16. A method of controlling a construction machine to control an image displayed on a display mounted in an operator's cab of the construction machine, the construction machine including an image capturing device configured to capture an image of surroundings, a menu switch, and a hardware processor configured to switch the image displayed on the display to a menu screen when the menu switch is operated, the menu screen showing an operating condition and various settings, the method comprising:

detecting, by the hardware processor, whether a work element is enabled or disabled based on an operation of a gate lock lever, wherein an operation of the menu switch during display of the captured image while the work element is enabled by the operation of the gate lock lever causes the hardware processor to display a warning on the display.

17. The method of controlling a construction machine as claimed in claim 16, wherein the operation of the menu switch during the display of the captured image while the work element is enabled causes the hardware processor to display the menu screen together with the warning on the display.

18. The method of controlling a construction machine as claimed in claim 16, wherein the operation of the menu switch during the display of the captured image while the work element is enabled causes the hardware processor to display the warning on the captured image.

\* \* \* \* \*